United States Patent
Feldman et al.

(10) Patent No.: US 7,111,372 B2
(45) Date of Patent: Sep. 26, 2006

(54) COMPUTER-CONTROLLED MILLING MACHINE FOR PRODUCING LENSES FOR CLIP-ON ACCESSORY

(75) Inventors: Zvi Feldman, Zoran (IL); Eyal Peleg, Zoran (IL)

(73) Assignee: Opti-Clip Ltd., Boca Raton, FL (US)

( * ) Notice: Subject to any disclaimer, the term of this patent is extended or adjusted under 35 U.S.C. 154(b) by 521 days.

(21) Appl. No.: 09/991,870

(22) Filed: Nov. 26, 2001

(65) Prior Publication Data

US 2003/0097741 A1 May 29, 2003

(51) Int. Cl.
*B23P 13/00* (2006.01)
*B23C 1/14* (2006.01)

(52) U.S. Cl. .................. 29/26 A; 409/165; 409/166; 409/221; 409/96; 409/230; 409/158; 409/146; 74/813 L; 74/816; 29/20; 269/254 CS (58) Field of Classification Search ............... 29/20, 29/26 R, 26 A; 409/166, 165, 168, 221, 224, 409/93, 94, 96, 80, 109, 144, 230, 158, 146; 74/816, 813 L; 108/20–21; 269/254 CS, 269/289 R; 451/379–380, 384, 385, 387, 451/390, 398, 403, 405, 413; 408/89–90

See application file for complete search history.

(56) References Cited

U.S. PATENT DOCUMENTS

| | | | | |
|---|---|---|---|---|
| 1,577,975 A | * | 3/1926 | Klausmeyer | 408/135 |
| 2,699,695 A | * | 1/1955 | Addison | 29/26 R |
| 3,587,390 A | * | 6/1971 | Lohneis et al. | 409/221 |
| 3,903,758 A | * | 9/1975 | Keichel | 74/813 L |
| 3,998,127 A | * | 12/1976 | Romeu | 409/224 |
| 4,118,844 A | * | 10/1978 | Matsuzaki et al. | 29/27 C |
| 4,411,626 A | * | 10/1983 | Becker et al. | 700/163 |
| 4,644,635 A | * | 2/1987 | Murai et al. | 409/221 |
| 4,678,381 A | * | 7/1987 | Bailey | 409/221 |
| 4,920,700 A | | 5/1990 | Murahashi et al. | |
| 4,984,351 A | * | 1/1991 | Matsuyama et al. | 29/33 P |
| 5,020,201 A | * | 6/1991 | Kitamura | 29/27 C |
| 5,184,306 A | * | 2/1993 | Erdman et al. | 700/163 |
| 5,257,198 A | * | 10/1993 | van Schoyck | 700/160 |
| 5,423,712 A | * | 6/1995 | Underwood et al. | 451/8 |
| 5,543,103 A | * | 8/1996 | Hogan et al. | 700/163 |
| 5,546,140 A | | 8/1996 | Underwood | |
| 5,611,137 A | * | 3/1997 | Braun | 29/26 A |
| 5,779,406 A | * | 7/1998 | Astor | 409/165 |
| 6,298,531 B1 | * | 10/2001 | Baumbusch et al. | 29/40 |

FOREIGN PATENT DOCUMENTS

| | | | | |
|---|---|---|---|---|
| DE | 196 16 526 A1 | 11/1997 | | |
| DE | 197 38 668 A1 | 3/1999 | | |
| GB | 759700 A1 | * | 10/1956 | 409/94 |
| JP | 59-201732 A | * | 11/1984 | |
| WO | WO 93/24856 | 12/1993 | | |
| WO | WO 95/04634 | 2/1995 | | |
| WO | WO 01/53038 A1 | 7/2001 | | |

OTHER PUBLICATIONS

Machinery's Handbook, $25^{th}$ ed., 1996, Industrial Press Inc., pp. 2390–2391.*
McGraw–Hill Concise Encyclopedia of Science & Technology, $4^{th}$ ed., 1998, McGraw Hill, pp. 75–76, 623, 1251, and 1881.*

* cited by examiner

*Primary Examiner*—Erica Cadugan
(74) *Attorney, Agent, or Firm*—Morgan, Lewis & Bockius LLP (57) ABSTRACT

A milling machine for shaping blanks to create filter lenses for a clip-on accessory whose pair of filter lenses register with a pair of optical lenses in prescription eyeglasses when the accessory is hitched onto the frame of the eyeglasses. The frame of the eyeglasses is composed of two like half sections having a predetermined geometry, an optical lens being mounted in each half-section. The filter lenses in the accessory which are joined by a bridge piece have a geometry matching that of the half-sections of the frame whereby the appearance of the clip-on accessory is compatible with that of the eyeglasses.

19 Claims, 4 Drawing Sheets

COMPUTER-CONTROLLED MILLING MACHINE FOR PRODUCING LENSES FOR CLIP-ON ACCESSORY

BACKGROUND OF THE INVENTION

1. Field of the Invention

This invention relates generally to a machine adapted to mill blanks to create filter lenses for a clip-on accessory which hitches onto the frame of prescription eyeglasses having a pair of optical lenses, the filter lenses then being in registration with the optical lenses to protect the wearer of these eyeglasses from harmful radiation. More particularly, the invention relates to a computer-controlled milling machine which produces filter lenses for a clip-on accessory whose geometry matches that of the frame of the eyeglasses.

2. Status of Prior Art

An individual who is myopic (near-sighted) or hyperopic (far-sighted), or suffers from other visual defects normally wears a pair of eyeglasses in which optical lenses are mounted in a frame having temple pieces hinged thereto. The optical lenses are designed to correct for the visual defects of the wearer and are therefore usually prescribed by an optometrist or an eye doctor.

The same individual may on occasion be exposed to harmful radiation, such as intense sunlight, rays from a welding arc or from a laser beam instrument. He therefore requires sunglasses or other radiation protection glasses whose filtration characteristics depend on the nature of the harmful radiation to which the wearer is exposed.

When an individual wearing prescription eyeglasses switches to a pair of sunglasses to protect his eyes from harmful radiation, it is essential that the filter lenses of these sunglasses have the same corrective optical properties as the optical lenses in his eyeglasses—otherwise he will not see clearly through his sunglasses. However, a pair of prescription sunglasses tailored to the eyes of its wearer is at least as expensive as a costly pair of prescription eyeglasses. Hence the wearer may be reluctant or unable to bear these additional costs.

To avoid the need for prescription sunglasses, the wearer of prescription eyeglasses can convert his eyeglasses to sunglasses simply by hitching onto the frame of his eyeglasses a clip-on accessory. This accessory is provided with a pair of filter lenses that register with the optical lenses of the eyeglasses to filter out harmful radiation.

The typical clip-on is a universal accessory in the sense that it is capable of being clipped onto the frame of a pair of prescription eyeglasses regardless of the geometry or design of this frame. This is a distinct advantage, for in this era of "designer" frames, eyeglasses are now marketed in a broad range of distinctly different styles.

The disadvantage of a universal clip-on accessory which may have discouraged its more widespread use is that the standardized design of a clip-on accessory includes round filter lenses. This design is usually incompatible with the frame design of the eyeglasses onto which the accessory is hitched. It is the frame of eyeglasses that impart to eyeglasses its overall appearance. Thus if the frame is composed of trapezoidally-shaped half-sections and the filter lenses of the clip-on accessory hitched thereon are circular, the appearance of the accessory is then incongruous and unappealing.

Hence while a clip-on accessory may be said to fit onto a pair of prescription eyeglasses, it would be more realistic to say that the clip-on accessory misfits these eyeglasses and renders them unattractive.

To obviate this drawback, there is disclosed in PCT patent publication WO 95/04634 "Clip-on Sunglasses and System for Cutting Clip-on Sunglasses" a machine to custom-cut the filter lenses of the clip-on accessory so as to impart thereto the same size and shape as the half-sections of the frame of the eyeglasses onto which the clip-on is hitched. To this end, the machine includes a holder for the eyeglasses to be copied and for the clip-on, and a cutter and stylus to trace the contours of the eyeglasses and to custom-cut the clip-on in accordance with this trace.

Also disclosing a method of customizing a clip-on accessory is PCT patent publication WO 93/24856 (1993). In this method, the pair of filter lenses for the clip-on have their perimeters cut to conform to the contours of a particular pair of eyeglasses. Of prior art interest is U.S. Pat. No. 5,546,140 to Underwood which discloses a machine for custom-cutting clip-on sunglasses, the machine trimming the sunglasses to conform to the shape and size of a pair of eyeglasses.

SUMMARY OF THE INVENTION

In view of the foregoing, the main object of this invention is to provide a computer controlled machine for milling blanks to create filter lenses for a clip-on accessory having a geometry which matches the geometry of the complementary half-sections of the eyeglass frame onto which the accessory is hitched.

By a filter lens is meant any lens adapted to cooperate with the optical lens of the eyeglasses onto which the accessory is hitched to protect the eyes of the wearer from harmful radiation, or to improve his vision. Thus the filter lens of the accessory may be an optical lens which combines with the optical lens of the eyeglasses to create a compound lens for vision correction.

Among the significant advantages in a clip-on accessory in accordance with the invention are the following:

A. The design of the clip-on accessory is fully compatible with that of the eyeglass frame onto which the clip-on is hitched whereby the attractive design of the eyeglasses is not degraded by the accessory. This is of particular value when the eyeglasses are those designed by a renowned designer and are costly.

B. Because the machine is computer-controlled, it creates a filter lens for a clip-on accessory whose geometry precisely matches that of a half-section of the frame of the eyeglasses.

C. Because the geometry of the clip-on accessory matches the geometry of the eyeglasses onto which it is hitched, it can readily be clipped onto the frame of the eyeglasses and requires no special handling.

D. The cost of manufacturing the clip-on accessory is relatively low, making it possible for the wearer of prescription eyeglasses to inexpensively convert his eyeglasses to sunglasses having the same prescription.

More particularly, it is an object of this invention to provide a milling machine in which a blank to be milled is supported on a rotary worktable to be engaged by a drilling bit that is shifted along X and Y coordinates to cut the blank to form a filter lens having the desired geometry. In the milling machine, the rotary motion of the worktable on which the blank is supported and the movements of the drill bit which act to shape the blank are computer-controlled to exactly impart the desired geometry to the blank.

Briefly stated, these objects are attained in a milling machine on whose rotary worktable is supported by a blank workpiece which is engaged by the bit of a drill bit unit mounted on an elevator. The elevator which acts to move the drill bit up and down along a vertical axis rides on a carriage movable along a horizontal track back and forth to shift the drill bit along a horizontal axis.

The rotary worktable, the elevator and the carriage are driven by respective stepping motors whose incremental advances are controlled by a computer. Digitally stored in the database of the computer is data regarding the geometry of the half-sections of the eyeglass frame on which the accessory is to be hitched. The computer acts to precisely position the drill bit with respect to the blank as it is being rotated, so as to impart thereto the desired geometry.

BRIEF DESCRIPTION OF THE DRAWINGS

For a better understanding of the invention as well as other objects and features thereof, reference is made to the annexed drawings wherein.

DETAILED DESCRIPTION OF THE INVENTION

Figure 1:
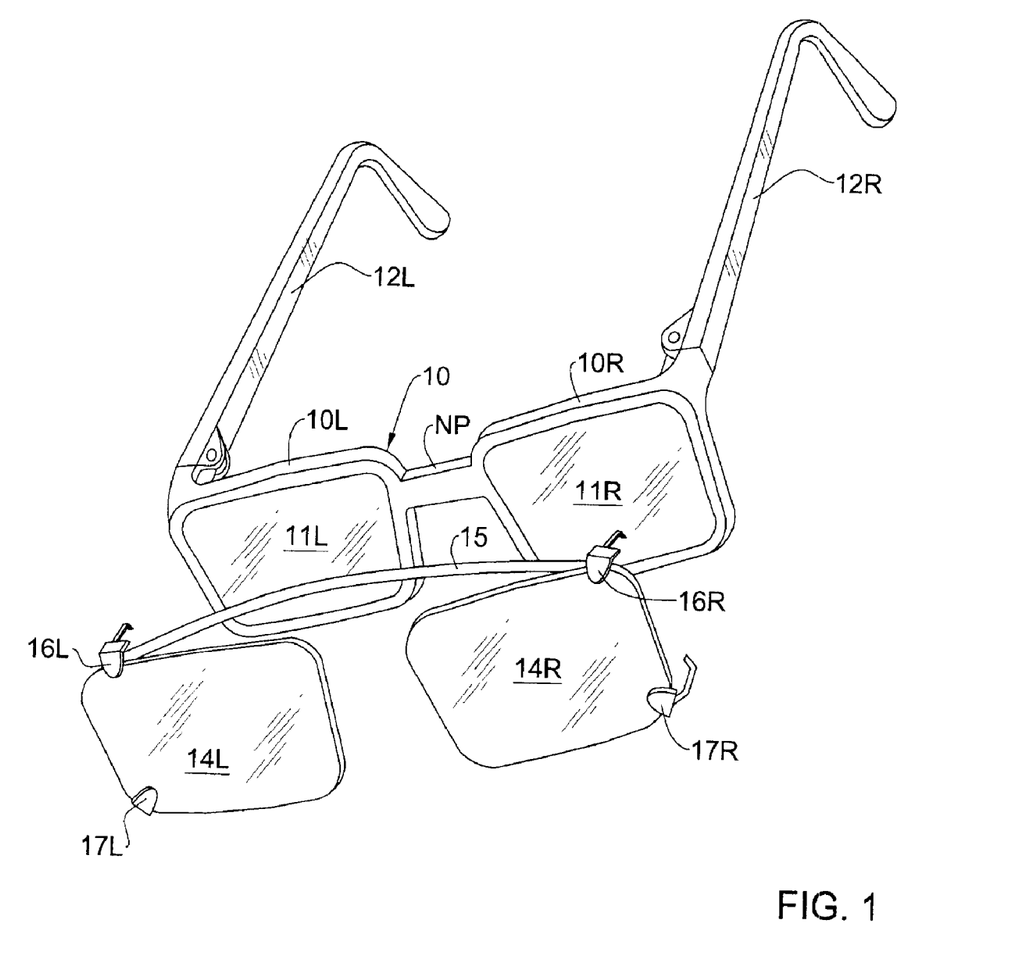
FIG. 1 illustrates a clip-on accessory in accordance with the invention adapted to hitch onto a pair of prescription eyeglasses.

Clip-On Accessory: FIG. 1 illustrates a pair of prescription eyeglasses for correcting visual defects in the eyes of the wearer, and it also shows a clip-on accessory in accordance with the invention which is to be hitched onto these eyeglasses to protect the eyes against harmful radiation.

Included in these eyeglasses is a metal or plastic frame 10 formed by left and right half sections 10L and 10R joined together by a nosepiece NP. Mounted in the half sections of the frame are optical lenses 11L and 11R. Half sections 10L and 10R of frame 10 have a generally trapezoidal geometry, with rounded corners. The optical lenses mounted in the half sections are similarly shaped. Hinged to the half sections of the frame are temple pieces 12L and 12R.

It is to be understood that the stylized frame 10 shown in FIG. 1 is by way of example only and that whatever the actual geometry of the eyeglasses to be fitted with a clip-on accessory, the geometry of the accessory must substantially match that of the frame so that the attractiveness of the eyeglasses is not degraded by the accessory.

As shown in FIG. 1, the clip-on accessory 13 is custom-made in the sense that it fits, as it were, like a glove on the frame of the prescription eyeglasses whose stylistic geometry it has copied. In the accessory, the geometry of filter lens 14L and 14R substantially matches that of the complementary half sections 10L and 10R of the eyeglasses frame 10.

When therefore these filter lenses overlie the optical lenses of the eyeglasses, they fully cover the half sections of the frame and there is no disparity in shape and size therebetween. Hence whatever design a designer gives to the frame of prescription eyeglasses, this design is preserved by the clip-on accessory hitched onto the frame.

Figure 2:
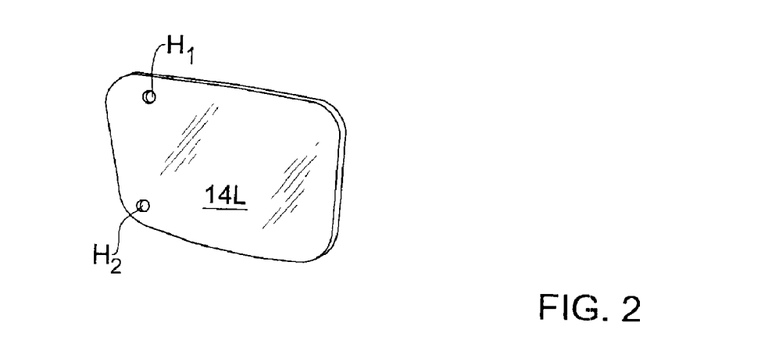
FIG. 2 separately shows one of the filter lenses included in the accessory.

Filter lenses 14L and 14R of the accessory are bridged by a bridge piece 15 of a high-strength flexible metal, such as stainless steel. Piece 15 acts to position the filter lenses so that they lie in registration with the optical lenses of the eyeglasses.

Filter lenses 14L and 14R are fabricated of high-strength, synthetic plastic material having a high index of transparency, such as a polyacrylic material. The filter lenses are tinted or otherwise treated to have the desired filtration characteristics so that they filter out or reduce the harmful radiation for which the accessory is designed. Thus if the accessory is intended to convert a pair of prescription eyeglasses to sunglasses, the plastic filter lenses may be smoked or tinted for this purpose.

But for other forms of radiant energy, such as rays emanating from an arc welding device or from a laser beam instrument, the filtration characteristics must be appropriate to these rays. Or the filter lens may have optical properties which when combined with those of the optical lenses of the eyeglasses then produce a compound lens affording visual correction beyond that provided by the optical lenses alone.

Figure 3:
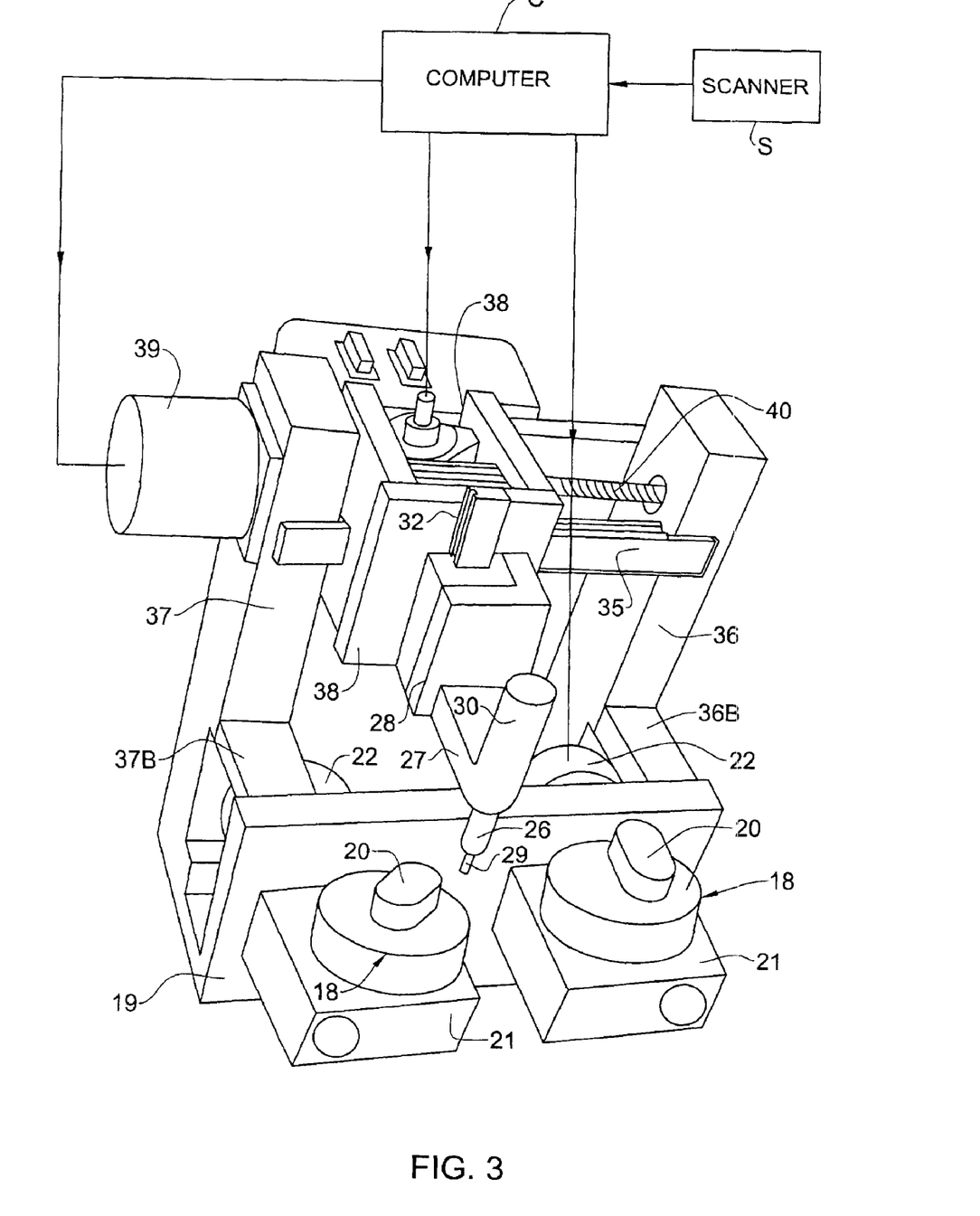
FIG. 3 is a perspective view of the milling machine in accordance with the invention for milling blanks to create the filter lenses of the clip-on accessory.
Figure 4:
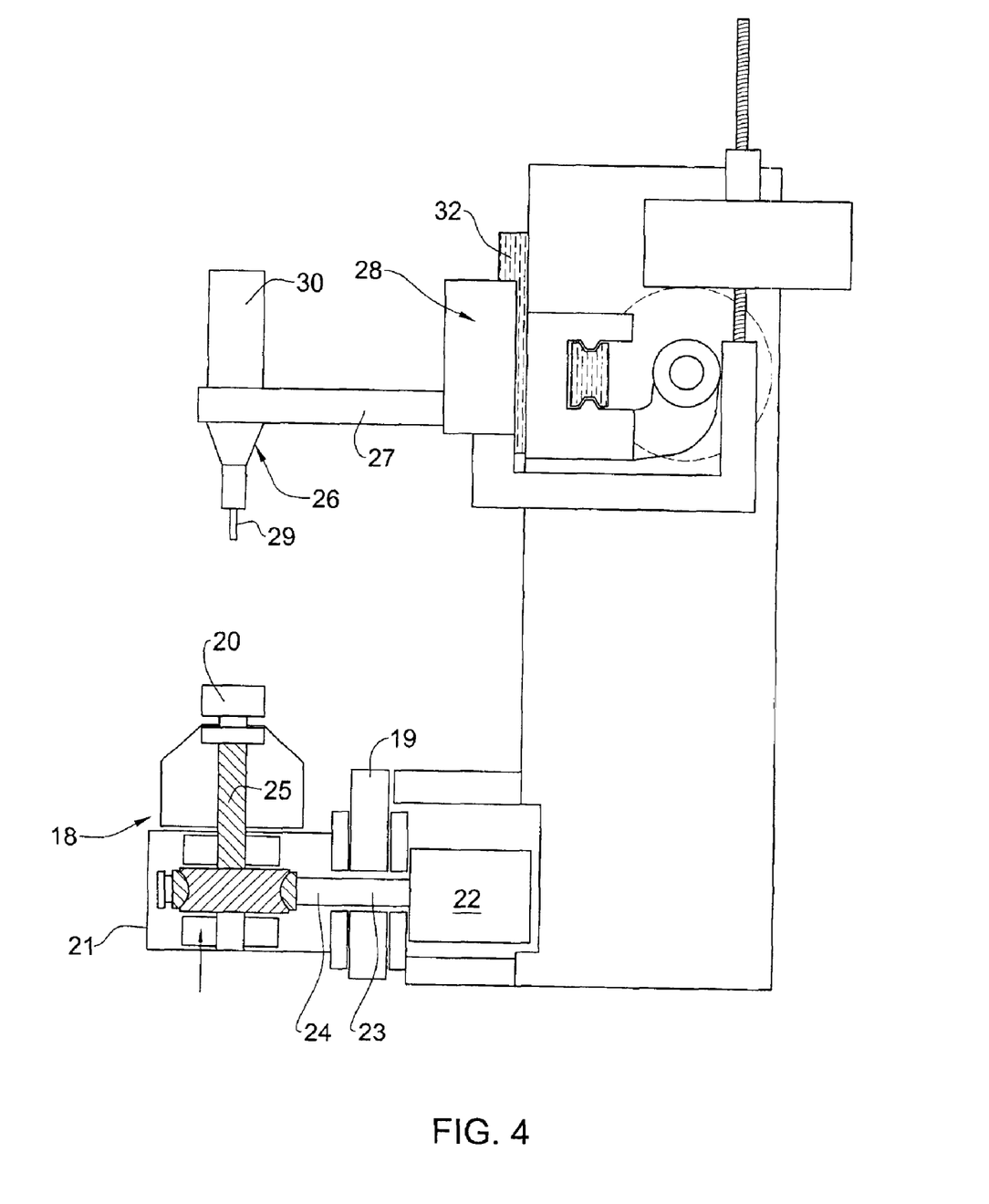
FIG. 4 is a section taken through a transverse plane in the machine shown in FIG. 3.

Milling Machine: The purpose of the milling machine illustrated in FIGS. 3 and 4 is to shape under computer-control a pair of blanks formed of transparent synthetic plastic material to create a pair of filter lenses for a clip-on accessory. The shaping of the blanks must be such as to impart to the resultant filter lenses substantially the same geometry as that of the half-sections of the frame of the prescription glasses onto which the accessory is to be hitched so that the style of the custom-made accessory is compatible with that of the eyeglasses.

The machine includes twin rotary worktable units 18 which support the blanks to be machined. These units are cantilevered from a vertical barrier wall 19 so that they are spaced apart at fixed and stable positions. Each unit 18 is provided with a rotary worktable 20 mounted above a gear train box 21 whose gears couple the worktable to a stepping motor 22 placed behind barrier wall 19. The shaft 23 of stepping motor 22 passes through a port in wall 19 to engage gears 24 in gear box 21, whose output shift 25 joins worktable 20 at its center.

A stepping motor is powered by a train of dc voltage pulses which cause the motor shaft to advance incrementally one angular step per pulse in a clockwise or counterclockwise direction, depending on the polarity of the pulses. These pulses are delivered to stepping motor 22 by a computer C which by controlling the number of pulses fed to the motor and their polarity can precisely position the worktable and the blank thereon to set it to a desired angular position.

Figure 5:
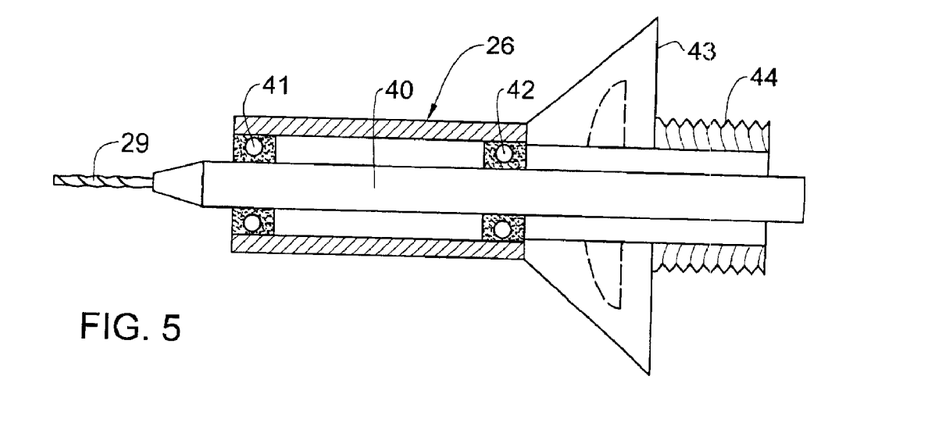
FIG. 5 is a longitudinal section taken through a preferred embodiment of the drill bit unit to be included in the machine.

Milling is carried out by a drill bit unit 26 cantilevered by an arm 27 from an elevator 28. Drill bit unit 26 includes a drill bit 29 capable of cutting and shaping plastic material as well as drilling a hole therein. It is continuously rotated at high speed by a standard dc motor 30 coupled to the drill bit unit.

It is to be noted that a unique feature of a computer-controlled milling machine in accordance with the invention is that its drill bit unit is capable of drilling, cutting, notching and engraving the blank being milled. In this way the blank is given a geometry matching that of the eyeglasses frame onto which the resultant filter lens is hitched, but the filter lens also has holes and notches by means of which clips can be anchored thereon. Engraving of the filter lens makes it possible to engrave therein a brand name or the name of the designer of the eyeglasses whose geometry is copied by the filter lens.

Elevator 28 rides on a carriage 38 that is movable back and forth on a horizontal track 35 bridging a pair of vertical pillars 36 and 37 which are parallel to the front wall 19 of the machine and are joined thereto by horizontal beams 36B and 37B. Elevator 28 rides up and down carriage 38 along a vertical rack 32 attached to the front side of carriage 38. Thus as the elevator travels up or down, it then shifts drill bit 29 of the drill bit unit 26 attached thereto along a vertical Y axis towards or away from the blank on the worktable.

Elevator 28 is driven by a stepping motor 33 powered and controlled by a train of dc pulses issuing from computer C. The number of pulses applied to the stepping motor and their polarity determines the direction and the extent to which elevator 28 is shifted in the Y direction. Carriage 38 is driven back and forth on track 25 by a stepping motor 39 mounted on vertical pillar 37, motor 39 turning a lead screw 40 which passes through threaded bores in the ends of the carriage. Stepping motor 39 is powered and controlled by a dc pulse train delivered thereto by computer C.

Thus the following three positions are controlled by computer C.
 I. The vertical position of drill bit 29 relative to the blank on the worktable, as determined by elevator 28 driven by stepping motor 28.
 II. The horizontal position of drill bit 29 relative to the blank, as determined by carriage 38 driven by stepping motor 39.
 III. The angular position of the blank relative to the drill bit, as determined by worktable 21 driven by stepping motor 22.

Computer C which delivers a train of power pulses to each of the three stepping motors, varies the number of pulses in each train and their polarity so as to coordinate their respective operations to cause the drill bit to shape the blank being worked on to produce a filter lens of the desired geometry.

In order that the geometry of the filter lenses of the accessory match the geometry of the half-sections of the frame of the eyeglasses onto which the accessory is hitched, it is necessary to inform the computer of this geometry. This information is supplied to the computer by an electronic scanner S.

Scanner S views the pair of prescription eyeglasses whose frame geometry is to be reproduced in a clip-on accessory, and it generates a digital image thereof. The digital image is processed in the computer to derive therefrom data regarding the predetermined geometry of the frame. By predetermined is meant the geometry of the frame given to it by its designer. This data is stored in the database of the computer memory which is then able to instruct the three stepping motors of the machine to coordinate their operations so as to give the blank being shaped the desired geometry.

As an alternative to a scanner adapted to scan whatever prescription eyeglasses are brought in by a wearer to have a matching clip-on accessory made, one can store in the database of the computer the geometry of the various frames that are currently being marketed (altogether at least 500). When an individual comes in with his eyeglasses for which he wishes to obtain a clip-on accessory, the operator of the clip-on service can by looking at the frame of the eyeglasses and recognizing its style, can then extract from the database the appropriate data.

To check on whether he has selected the right data, the operator can display on the monitor screen associated with the computer an image of the selected frame geometry, and can compare this image with the frame of the spectacles for which the clip-on accessory is intended.

In the computer-controlled machine in accordance with the invention's digital data yielded by a scanner regarding the geometry of the eyeglasses frame is stored in the database of the computer. This data instructs the milling machine so that the blank being shaped results in a filter lens whose geometry matches that of the frame. But it is also necessary to drill and notch the filter lens so that clips can be anchored therein to hitch the filter lens onto the frame. For this purpose the computer is provided with software that instructs the milling machine to drill and notch the filter lens at the proper positions.

Worktable: In order for the worktable in the milling machine to precisely position a blank work piece supported on the table driven by a stepping motor, it is essential that when the rotary worktable is shifted to a particular angular position, that it then maintains this position. Should there be "play" in the drive mechanism (freedom to deviate slightly away from the set position) then this tolerance will adversely affect the shaping precision of the machine.

Figure 6:
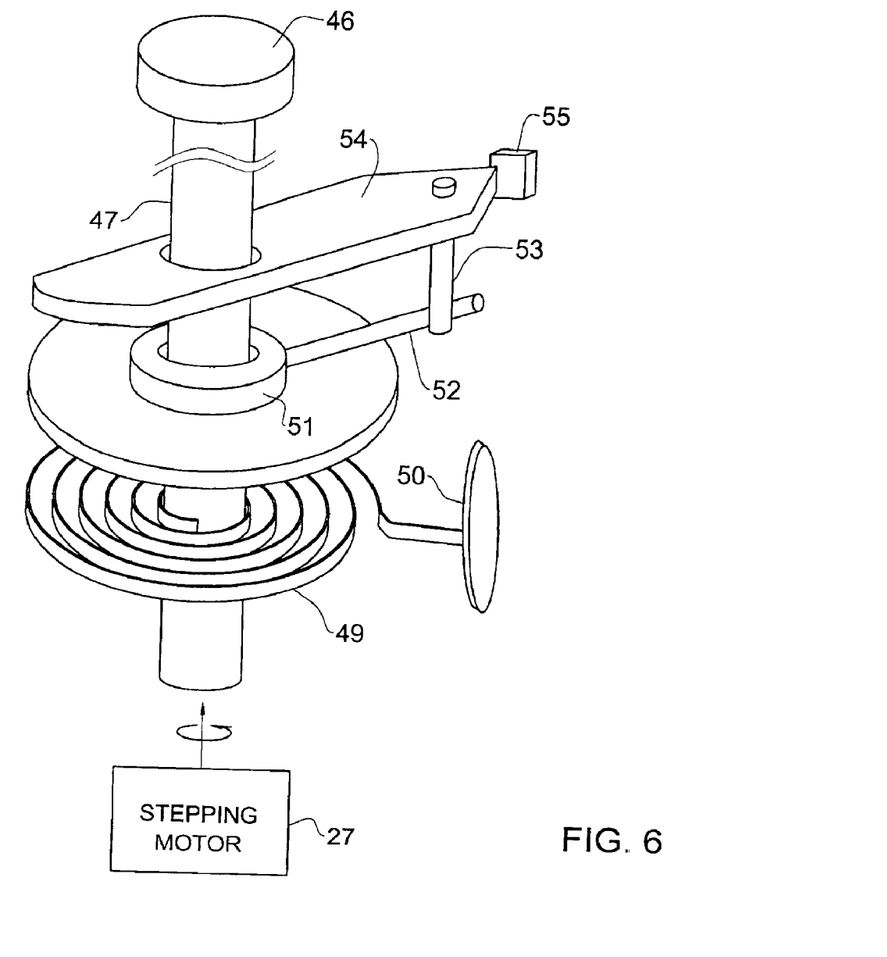
FIG. 6 is a perspective view of a preferred embodiment of a worktable to be included in the machine.

To eliminate this play, the worktable 46 shown in FIG. 6 is mounted on a shaft 47 driven by a stepping motor 48 to turn incrementally in the counterclockwise direction. Surrounding shaft 47 is a spiral spring 49 formed of spring metal, the inner end of the spring being joined to the shaft and the outer end to a fixed body 50 in the machine. Thus each time shaft 49 is caused to turn one step by stepping motor 48, spiral spring 49 is wound to tighten it.

As a consequence the shaft is subjected by the spring to a tension force that holds the turntable at its set position and prevents it from deviating therefrom. With successive steps of the motor which incrementally advance the worktable, the spring is further tightened until a point is reached at which it is fully tightened and therefore cannot continue to be tightened.

In order to release the fully-tightened spring so that it can resume its function to prevent play of the worktable, there is fixedly mounted on shaft 47 a ring 51. Projecting horizontally from this ring is a rod 52 which is joined to a vertical finger 53 connected to the end of a pointer arm 54 that is free to swing about shaft 47.

When the spring is being tightened this causes pointer arm 54 to swing in a counterclockwise direction until it strikes the actuator 55 of a spring-release mechanism which is actuated when the spiral spring is fully tightened and movement of the shaft is then arrested. The resultant unwinding of the spring makes it possible to resume the worktable operation.

While there has been shown preferred embodiments of a milling machine in accordance with the invention, it is to be understood that many changes may be made therein without departing from the spirit of the invention.

Thus when the prescription eyeglasses having a pair of optical lenses is "rimless" and therefore has no separate frame, the clip-on accessory having a pair of filter lenses hitches onto the borders of the optical lenses. These borders effectively function as the frame of the eyeglasses, and the geometry of these framing borders must be matched by the filter lenses of the accessory.

What is claimed is:

1. A machine for shaping blanks to create filter lenses to be included in a clip-on accessory having a pair of filter lenses which, when the accessory is hitched onto a pair of eyeglasses, having two half sections, then lie in registration with these half sections, said eyeglasses having a predetermined geometry that is matched by the geometry of the filter lenses, said machine comprising:

A. A part of worktables each to support one of the blanks to be shaped, and each having a first motor for driving the worktable;

B. A drill bit unit provided with a rotatable drill bit;

C. An elevator supporting said drill bit unit and shiftable along a vertical axis to raise or lower the drill bit with respect to the blank on each worktable, and a second motor for driving the elevator;

D. A carriage carrying said elevator and shiftable along a horizontal axis to move the drill bit back and forth with respect to said blank, said carriage being driven by a third motor; and E. A processor to coordinate the operation of the first, second and third motors to cause said drill bit to shape the blank to form a filter lens of the desired geometry.

2. A machine as set forth in claim 1, in which said first, second and third motors are stepping motors each powered by a train of dc pulses the polarity of which determines the extent and direction of movement.

3. A machine as set forth in claim 2, in which said computer controls the stepping motors by varying the number of pulses in the train and their polarity.

4. A machine as set forth in 1, in which the drill bit drills holes in said blank to receive plugs of a clip for anchoring the clip on the filter lens so that the accessory can be hitched onto the eyeglasses.

5. A machine as set forth in claim 1, which the drill bit unit is driven to rotate continuously by a motor.

6. A machine as set forth in claim 5, in which the drill bit unit is self-sufficient and can be decoupled from its drive motor.

7. A machine as set forth in 1, in which digitally stored in a database of the computer is digital data regarding the predetermined geometry of the frame, from which data the computer controls the motors to produce a filter lens having a matching geometry.

8. A machine as set forth in claim 7, further including an electronic scanner to scan the frame of the eyeglasses to which the clip-on is to be hitched, the scanner supplying the computer with a digital image of the frame from which the data stored in the database is obtained.

9. A machine as set forth in claim 1, in which each worktable is driven by its own said first motor through a shaft, further including means to tension said shaft to maintain the worktable at a set position.

10. A machine as set forth in claim 9, in which the tension means is provided by a spiral spring surrounding said shaft wherein one end of the spring is attached to the shaft, and the other end to a fixed body.

11. A machine as set forth in claim 1, wherein the machine is adapted to perform drilling, milling, cutting, matching and engraving operations by means of the same drill bit.

12. A machine for shaping blanks to create a pair of lenses to be attached onto the frame of a pair of eyeglasses, mounted in half sections of the frame, said frame having a predetermined geometry; said machine comprising:

A. A pair of worktables each to support one of the blanks to be shaped, and each having a first motor for driving worktable;

B. A drill bit unit provided with a rotating drill bit;

C. An elevator supporting said drill bit unit and shiftable along a vertical axis to raise or lower the drill bit with respect to the blank on each worktable, and a second motor for driving the elevator;

D. A carriage carrying said elevator and shiftable along a horizontal axis to move the drill bit back and forth with respect to said blank, said carriage being driven by a third motor; and E. A processor to coordinate the operation of the first, second and third motors to cause said drill bit to shape the blank to form a lens of the desired geometry.

13. A machine as set forth in claim 12, in which said first, second and third motors are stepping motors each powered by a train of dc pulses the polarity of which determines the extent and direction of movement.

14. A machine as set forth in claim 12, in which said processor controls the stepping motors by varying the number of pulses in the train and their polarity.

15. A machine as set forth in claim 12, in which the drill bit unit is driven to rotate continuously by a motor.

16. A machine as set forth in claim 15, in which the drill bit unit is self-sufficient and can be decoupled from its drive motor.

17. A machine as set forth in claim 12, in which digitally stored in a database of a computer is digital data regarding the predetermined geometry of the frame, from which data the computer controls the motors to produce a lens having a matching geometry.

18. A machine as set forth in claim 12, in which each worktable is driven by its own said first motor through a shaft, further including means to tension said shaft to maintain the worktable at a set position.

19. A machine as set forth in claim 18, in which the tension means is provided by a spiral spring surrounding said shaft wherein one end of the spring is being attached to the shaft, and the other end to a fixed body.

* * * * *

UNITED STATES PATENT AND TRADEMARK OFFICE
CERTIFICATE OF CORRECTION

PATENT NO.         : 7,111,372 B2
APPLICATION NO.    : 09/991870
DATED              : September 26, 2006
INVENTOR(S)        : Zvi Feldman and Eyal Peleg It is certified that error appears in the above-identified patent and that said Letters Patent is hereby corrected as shown below:

Title page, item 73, please correct the assignee's name from "Opti-Clip Ltd." to --Opti-Clip International LLC--.

Column 7, line 2, cancel the text beginning with "1. A machine for shaping blanks" to and ending "by a motor." in column 7, line 37, and insert the following five claims:

1. A machine for shaping blanks to create filter lenses to be included in a clip-on accessory having a pair of filter lenses which, when the accessory is hitched onto a pair of eyeglasses, having two half sections, then lie in registration with these half sections, said eyeglasses having a predetermined geometry that is matched by the geometry of the filter lenses, said machine comprising:
   A. A pair of worktables each to support one of the blanks to be shaped, and each to be driven by a first motor;
   B. A drill bit unit provided with a rotatable drill bit;
   C. An elevator supporting said drill bit unit and shiftable along a vertical axis to raise or lower the drill bit with respect to the blank on each worktable, and a second motor for driving the elevator;
   D. A carriage carrying said elevator and shiftable along a horizontal axis to move the drill bit back and forth with respect to said blanks, said carriage being driven by a third motor; and
   E. A processor including a digitally stored database in which is stored digital data regarding the predetermined geometry of the frame of the eyeglasses, from which data the processor coordinates the operation of the first, second and third motors to cause said drill bit to shape the blanks to form the filter lenses of the matching geometry.

2. A machine as set forth in claim 1, in which said first, second and third motors are stepping motors each powered by a train of dc pulses, the polarity of which determines the extent and direction of movement.

3. A machine as set forth in claim 2, in which said processor controls the stepping motors by varying the number of pulses in the train and their polarity.

4. A machine as set forth in claim 1, in which the drill bit drills holes in said blanks to receive plugs of a clip for anchoring the clip on the filter lenses so that the accessory can be hitched onto the eyeglasses.

5. A machine as set forth in claim 1, in which the drill bit unit is driven to rotate continuously by a motor.

UNITED STATES PATENT AND TRADEMARK OFFICE
CERTIFICATE OF CORRECTION

PATENT NO.       : 7,111,372 B2
APPLICATION NO.  : 09/991870
DATED            : September 26, 2006
INVENTOR(S)      : Zvi Feldman and Eyal Peleg It is certified that error appears in the above-identified patent and that said Letters Patent is hereby corrected as shown below:

Column 7, line 41, cancel the text beginning with "7. A machine as set forth in 1" to and ending "direction of movement." in column 8, line 31, and insert the following seven claims:

7. A machine as set forth in 1, in which the processor includes a computer in which the database is digitally stored.

8. A machine as set forth in claim 7, further including an electronic scanner to scan the frame of the eyeglasses to which the clip-on accessory is to be hitched, the scanner supplying the computer with a digital image of the frame from which the data stored in the database is obtained.

9. A machine as set forth in claim 1, in which each worktable is driven by its own said first motor through a shaft, and further including means to tension each said shaft to maintain the respective worktable at a set position.

10. A machine as set forth in claim 9, in which each tension means is provided by a spiral spring surrounding the respectively shaft wherein one end of each spring is attached to the respective shaft, and the other end to a fixed body.

11. A machine as set forth in claim 1, wherein the machine is adapted to perform drilling, milling, cutting, notching, and engraving operations by means of the same drill bit.

12. A machine for shaping blanks to create a pair of lenses of an auxiliary clip-on accessory to be attached onto the frame of a pair of eyeglasses, mounted in half sections of the frame, said frame having a predetermined geometry; said machine comprising:
  A. A pair of worktables each to support one of the blanks to be shaped, and each having a first motor for driving a respective one of the worktables;
  B. A drill bit unit provided with a rotating drill bit;
  C. An elevator supporting said drill bit unit and shiftable along a vertical axis to raise or lower the drill bit with respect to the blank on each worktable, and a second motor for driving the elevator;
  D. A carriage carrying said elevator and shiftable along a horizontal axis to move the drill bit back and forth with respect to said blank, said carriage being driven by a third motor; and
  E. A processor including a digitally stored database in which is stored digital data regarding the predetermined geometry of the frame of the eyeglasses, from which data the processor coordinates the operation of the first, second and third motors to cause said drill bit to shape the blanks to form the accessory lenses of the desired geometry.

UNITED STATES PATENT AND TRADEMARK OFFICE
CERTIFICATE OF CORRECTION

| | |
|---|---|
| PATENT NO. | : 7,111,372 B2 |
| APPLICATION NO. | : 09/991870 |
| DATED | : September 26, 2006 |
| INVENTOR(S) | : Zvi Feldman and Eyal Peleg |

It is certified that error appears in the above-identified patent and that said Letters Patent is hereby corrected as shown below:

13. A machine as set forth in claim 12, in which said first, second and third motors are stepping motors each powered by a train of dc pulses, the polarity of which determines the extent and direction of movement.

On column 8, line 36, in claim 15, please insert --drive-- before "motor."

Column 8, line 40, cancel the text beginning with "17. A machine as set forth in claim 12" to and ending "a fixed body." in column 8, line 52, and insert the following three claims:

17. A machine as set forth in claim 12, in which the processor includes a computer in which the database is digitally stored.

18. A machine as set forth in claim 12, in which each worktable is driven by its own said first motor through a shaft, and further including means to tension each said shaft to maintain the respective worktable at a set position.

19. A machine as set forth in claim 18, in which each tension means is provided by a spiral spring surrounding the respective shaft wherein one end of each spring is attached to the respective shaft, and the other end to a fixed body.

Signed and Sealed this

Nineteenth Day of February, 2008

JON W. DUDAS
*Director of the United States Patent and Trademark Office*